Patented Sept. 14, 1937

2,092,973

UNITED STATES PATENT OFFICE 2,092,973

PROCESS FOR THE MANUFACTURE OF PARA TERTIARY BUTYL ANILINE

Bernard Herstein, Brooklyn, N. Y., assignor to U. S. Industrial Alcohol Co., New York, N. Y., a corporation of West Virginia No Drawing. Original application October 22, 1935, Serial No. 46,123. Divided and this application January 22, 1937, Serial No. 121,819

1 Claim. (Cl. 260—130.5)

This application is a division of application Serial No. 46,123, filed October 22, 1935.

The object of the invention claimed herein is to provide a simple and economical way of manufacturing para tertiary butyl aniline, a compound which is suitable for purposes similar to those for which para-toluidine is used, for the production of compounds of the same general character but with some specific properties of their own.

The following example illustrates the preferred mode of operation. The parts of ingredients will be understood to be parts by weight.

34 parts acetanilid are suspended in 85 parts ethylene dichloride and 40 parts anhydrous aluminum chloride are added. The temperature tends to rise but by cooling is not permitted to go above 50° C. When all but a very small amount of aluminum chloride is in solution the reaction mixture is cooled to −10° C. and 25.2 parts tertiary butyl chloride added. The temperature is maintained at about −5° C. for 30 minutes. At this temperature, the evolution of hydrochloric acid gas is not vigorous and the reaction may be maintained at that temperature at which the evolution of HCl is just visible from the surface of the reaction mixture.

This is then poured cautiously into 250 parts of cracked ice by which the intermediate complex of aluminum chloride and the organic compound is decomposed by the water and the aluminum chloride goes into solution while the p-tertiary butyl acetanilid and ethylene dichloride form a doughy mass or solution which is removed and washed two or three times with fresh water to leach out as much inorganic material as possible. The solvent ethylene dichloride is then removed either by steam distillation or other convenient method. This leaves the product, para tertiary butyl acetanilid, behind in the form of a crystalline mass which may be filtered and washed and subsequently dried. The average weight of the material thus obtained is 45–46 parts. The material may be further purified if desired, though a higher degree of purity is not required for most purposes.

From the para tertiary butyl acetanilid thus produced the para tertiary butyl aniline product is obtained by subjecting the former product to a simple hydrolysis or de-acetylation step of known character, using either alkalis or acids for the purpose as is well known in the art.

I claim:

The process which comprises reacting acetanilid with tertiary butyl chloride in the presence of anhydrous aluminum chloride, obtaining from the reacted mixture para tertiary butyl acetanilid, and deacetylating this material to obtain para tertiary butyl aniline.

BERNARD HERSTEIN.